United States Patent [19]

Karliner

[11] Patent Number: 4,574,988
[45] Date of Patent: Mar. 11, 1986

[54] PRESSURE VESSEL FOR RECEIVING LIQUIDS

[75] Inventor: Rudolf Karliner, Minnetonka, Minn.

[73] Assignee: J. Wagner GmbH, Fed. Rep. of Germany

[21] Appl. No.: 581,355

[22] Filed: Feb. 17, 1984

[30] Foreign Application Priority Data

Feb. 18, 1983 [DE] Fed. Rep. of Germany ....... 3305658

[51] Int. Cl.$^4$ ............................................. B65D 51/16
[52] U.S. Cl. ..................................... 222/396; 220/316
[58] Field of Search .................... 222/396, 397, 402.11, 222/402.14; 251/149.9; 220/367, 316, 327; 137/587

[56] References Cited

U.S. PATENT DOCUMENTS 3,158,292  11/1964  O'Donnell ................. 222/402.11 X
4,457,642   7/1984  Braithwaite et al. .......... 222/397 X
4,465,202   8/1984  Stoves et al. .................. 220/316 X Primary Examiner—Stanley H. Tollberg
Attorney, Agent, or Firm—Hill, Van Santen, Steadman & Simpson

[57] ABSTRACT

A pressure vessel for storing and delivering liquid under pressure which includes a housing, a removable cover on the housing, and a seal between the housing and the cover providing a liquid-tight and air-tight seal. Locking elements cooperate between the cover and the housing to provide a bayonet type lock therebetween. The vessel is provided with a manually unlockable excess pressure valve in the cover, the valve having a seating face arranged to be seated against a valve seat and the cover and a spring which urges the valve seating face into such seated relation. The structure is also provided for locking the valve seating face in unseated relation against the action of the spring means.

20 Claims, 8 Drawing Figures

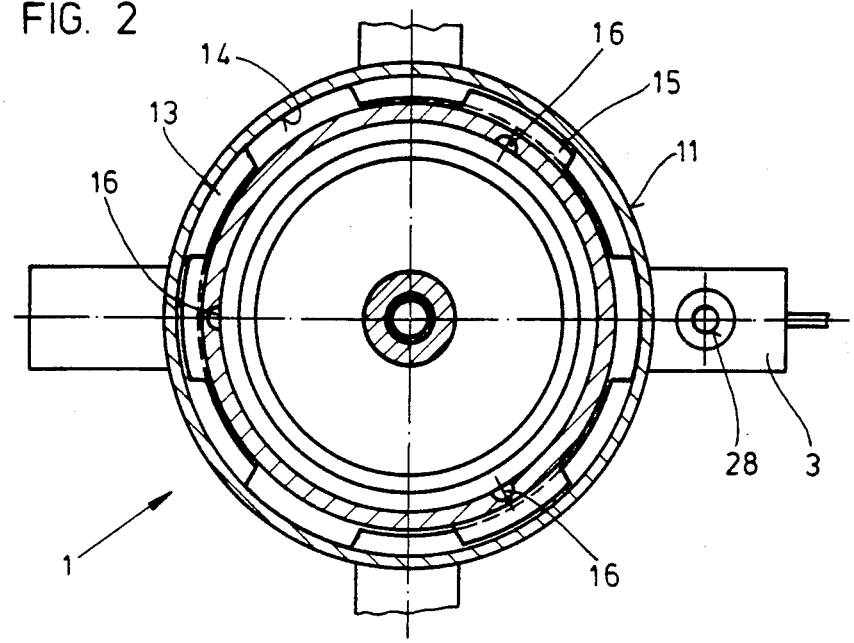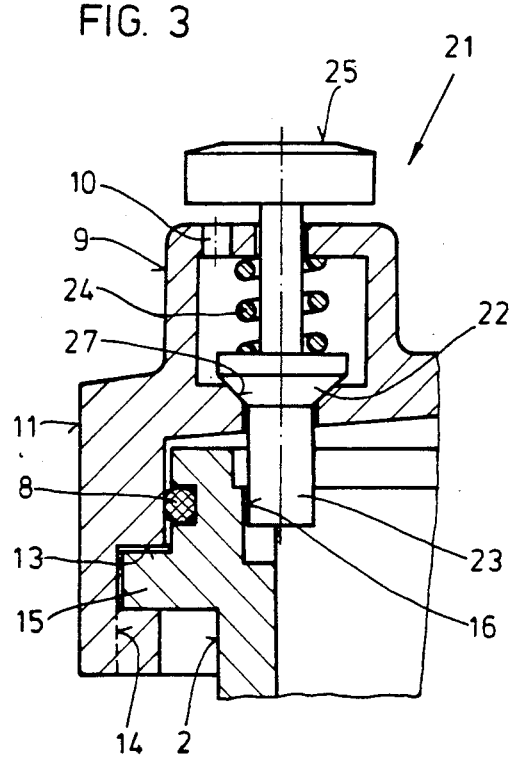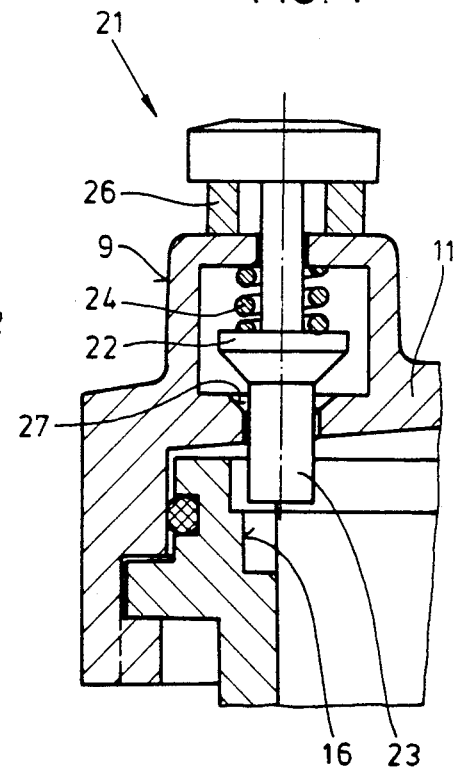

PRESSURE VESSEL FOR RECEIVING LIQUIDS

BACKGROUND OF THE INVENTION

1. Field of the Invention

This invention relates to a pressure vessel for receiving liquids, particularly for continuously feeding paint to a paint roller or the like wherein the roller is connected to the pressure vessel by means of a hose. The invention is particularly concerned with a manually unlockable excess pressure valve which relieves the pressure in the vessel before the cover is removed.

2. Description of the Prior Art

In some pressure vessels used for delivering paint or other liquid under pressure, the cover of the vessel is U-shaped in cross section and is received in threaded engagement on the outer casing of the receptacle. Although there is a seal fixed between the two parts, a reliable support of the cover and a pressure-tight seal are frequently not provided. The screw connection can, occasionally, be insufficiently tight. It can also become loose by itself due to vibration so that a pressure reduction takes place in the pressure vessel and a proper method of operation is no longer possible. Also, the refilling of a pressure vessel designed in this manner is very time-consuming and cumbersome since in most instances the operating apparatus is connected to the cover and must be removed or rotated together with the cover many times during unscrewing of the cover from the casing.

SUMMARY OF THE INVENTION

The present invention provides a pressure vessel for receiving liquids of the above-noted type in which the cover can be removed and placed on again in a simple fashion and in a short time. One of the features of the invention is that the cover is retained in the closed position so that an unintentional opening of the cover and release of the pressure is avoided. The handling during removal of the cover and the repeated tightening of the cover are reliable and simple. The cost of the improved device is also low.

In one form of the present invention, the vessel cover is connected with the pressure vessel itself by means of a bayonet lock which is formed by two or more grooves formed in the vessel cover which are preferably arranged uniformly distributed around the circumference and extend in circumferential direction. These grooves cooperate with projections formed in the upper region of the pressure vessel which projections are capable of being inserted in the grooves through rotation. For guarding against excess pressure and for the purpose of locking the vessel cover in closed position, an excess pressure valve is inserted in the cover which is manually unlockable and which has an adjustable valve body capable of a snap-in engagement with the pressure vessel.

In order to guarantee reliable securing of the vessel cover in its closed position, the valve body of the excess pressure valve is provided with an extension which is capable of being inserted in suitable open recesses formed in the end face of the vessel wall facing the vessel cover.

A spring-loaded excess pressure valve is disposed in a chamber preferably molded in the vessel cover on the end wall of which the valve spring is supported so that the latter is protected from damage.

To unlock the excess pressure valve, there is provided a handle which projects from the chamber and is provided preferably on its upper end face, with one or more stop cams which cooperate with the handle such that in one rotational position of the handle, the extension engaging in the recess of the vessel wall is locked out of engagement. The pressure vessel is thus relieved of pressure before the cover can be removed and the locking is cancelled with rotation of the cover so that removal and replacement of the cover can be carried out without difficulty.

In order to simplify the location of the cover it is desirable to provide each of the projections molded into the vessel wall with a recess at its center for the purpose of snap-in engagement of the extension applied to the valve body.

The vessel cover can be equipped with a centrally disposed collar for the purpose of suppporting and fastening a suction hose capable of being inserted in the pressure vessel, the hose leading to the paint roller.

The embodiment provided in accordance with the present invention makes it possible, with simple means, to secure and detach a cover of a pressure vessel without difficulties. The possibility of the cover being able to come loose by itself and lose the internal pressure is eliminated. When the cover is secured to the pressure vessel by means of a lock, with the aid of the excess pressure valve, the vessel cover is securely locked in closed position. Damage to the seal is therefore impossible. Locking and unlocking is achieved by means of a minor amount of rotation, 90° or so, in the cover. Consequently, the removal of the cover and the exchange of a paint receptacle, if necessary, can be carried out in a short time. The danger of an accident is also avoided since the receptacle is not under pressure when it is to be opened.

In another form of the present invention there is provided a valve stem which is mounted for vertical sliding movement in the cover. The valve stem carries a latch which is arranged to be seated in a groove formed in the upper portion of the housing, the latch being received within the groove when the cover and housing are in a closed position wherein there is a liquid-tight and air-tight seal between the cover and the housing. The valve stem is oriented in its open positions so as to vent air from the housing and closes off passage of air from the housing in the closed position of the cover relative to the housing. Consequently, the air must be released from within the housing before the cover can be disengaged from the housing, thereby preventing accidental discharge of the material from the housing while under pressure.

BRIEF DESCRIPTION OF THE DRAWINGS

A further description of the present invention will be made in conjunction with the attached sheets of drawings in which:

FIG. 2 is a cross-sectional view taken substantially along the line II—II of FIG. 1;

FIG. 3 is a fragmentary view in cross section of the excess pressure valve locking the cover, in an enlarged view;

FIG. 4 illustrates the excess pressure valve in its unseated position;

DESCRIPTION OF THE PREFERRED EMBODIMENTS

Figure 1:
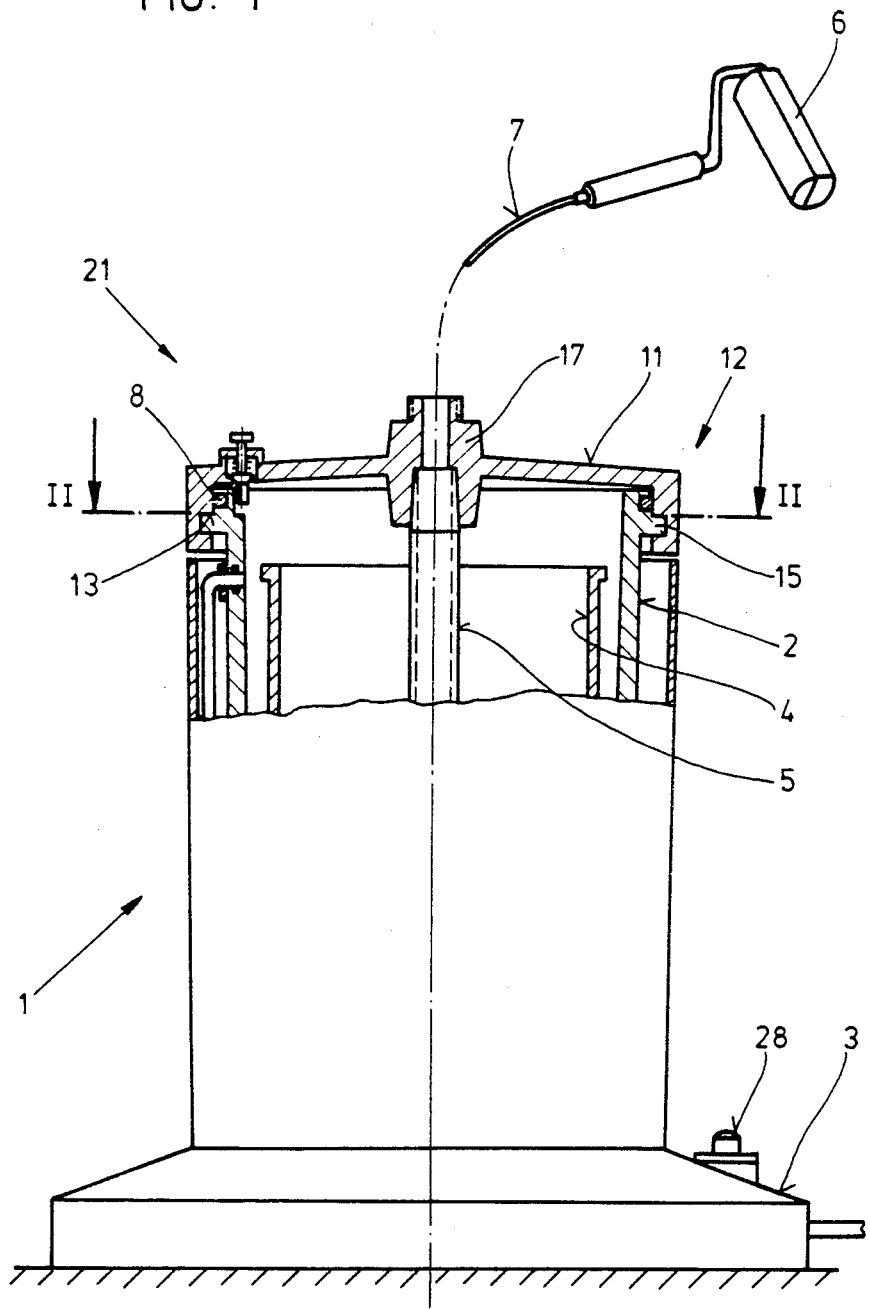
FIG. 1 is a view partly in elevation and partly in cross section of an improved pressure vessel according to the present invention.
Figure 5:
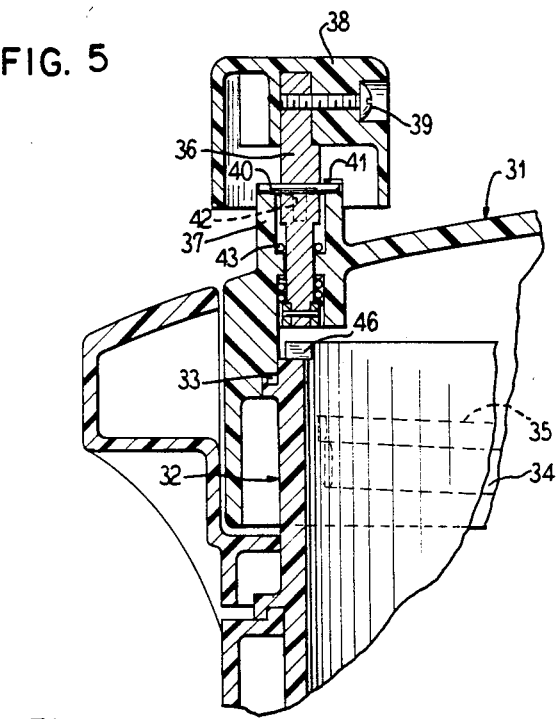
FIG. 5 is a fragmentary cross-sectional view of a modified form of the present invention showing the cover and the housing in the venting or open position.

The pressure vessel of the present invention is identified at reference numeral 1 in FIG. 1. It includes spaced feet 3 and is sealed in gas-tight and liquid-tight relationship by means of a movable cover 11. Inside the housing there is a paint receptacle 4 from which liquid paint is continuously supplied to a paint roller 6 by means of a hose 7. The paint is forced out of the receptacle 4 by superatmospheric pressure prevailing in the pressure vessel 1 as generated, for example, by means of a compressor (not shown) actuated by means of a foot-operated switch 28. The pressure acts on the liquid paint disposed in the receptacle 4 so that it is conveyed through an uptake feed pipe 5 mounted on a collar 17 having a bore therethrough against which the feed pipe 5 is seated.

The connection between the cover 11 and the pressure vessel 1 takes the form of a quick release, part turn threaded bayonet lock generally indicated at reference numeral 12 in the drawings. The lock thread is provided by means of annnular grooves 13 formed into the collar of the cover beyond the wall of the vessel 2, the grooves being interrupted by recesses 14 and by radially directed projections 15 which are formed on the vessel wall 2. The recesses 14 and the projections 15 are arranged uniformly about the circumference in such a way that the projections 15 can be inserted in the recesses 14 and through a minor rotation of the cover 11 will lie in the grooves 13. It is preferred that a ⅓ or ¼ turn thread lock be used.

In the locked position, a seal 8 is compressed between the cover and the vessel to provide a gas-tight and liquid-tight connection. An excess pressure valve assembly 21 is provided in a valve housing 9 which may be molded integrally with the cover 11. A vent opening 10 is formed in the valve housing 9 as illustrated in FIG. 3.

A frusto-conical valve seat 22 is formed on a valve stem 30 and is pressed into seated relation by means of a valve spring 24 against a valve seating surface 27 formed in the cover 11. Below the valve seat 22 there is a bolt-shaped extension 23 which projects into the pressure vessel 1. Internally open semicircular recesses 16 are arranged to receive the extension 23 in variable positions along the circumferences illustrated in FIG. 2. The semicircular recesses 16 are positioned approximately centrally relative to the projections 15. Thus, when the cover 11 is placed on the pressure vessel 1, and rotated in such fashion that the extension snaps into one of the recesses 16, the cover is held safe against rotation and cannot unintentionally be removed.

In order to release the locking, the extension 23 is lifted out of the recess 16. For this purpose, there is molded on the valve body 22 a handle 25 which projects from the valve housing 9 toward the exterior.

On the valve housing, as shown in FIG. 4, there are provided stop cams 26 such that through lifting and slight rotation, for example, through 90°, not only is the locking of the cover 11 with the pressure vessel 1 disengaged but also the valve 21 is opened and the excess pressure prevailing in the pressure vessel 1 is reduced. Then, the cover can be removed by means of slight rotation without a significant pressure force acting on the latter. The abutment of the handle 25 against stop cams 26 keeps the valve seat 22 in its opened position.

In the form of the invention illustrated in FIGS. 5 through 8, there is provided a removable cover generally indicated at reference numeral 31 which is releasably secured to a housing generally indicated at reference numeral 32. Suitable shoulders are provided on both the cover 31 and the housing 32 to confine a seal ring therebetween, the seal ring 33 when compressed providing a liquid-tight and air-tight seal between the cover and the housing.

Internal complementary helical rib segments are provided on both the cover and the housing, those on the cover being identified at reference numeral 34 while those on the housing are identified at reference numeral 35. In the closed position of the device illustrated in FIG. 8, the helical rib segments 34 of the cover underlie the segments 35 of the housing so that upon rotation of the cover 31 relative to the housing 32, a wedged engagement occurs compressing the seal ring 33 and providing the liquid-tight and air-tight engagement between the two.

A valve stem 36 is mounted for sliding movement within a boss 37 formed within the cover 31. A knob 38 is fixedly secured to the upper end of the stem 36 by means of a set screw 39.

The valve stem 36 carries a pin 40. In the open or venting position of the cover illustrated in FIG. 5, the pin 40 rides on the upper surface of the boss 37 and is prevented from further rotary movement by a stop 41 formed on the upper surface of the boss 37. In the closed position which is accomplished by rotating the knob 38 approximately 90° from the position shown in FIG. 5, the pin 40 drops into a slot 42 as best illustrated in FIG. 8.

Figure 7:
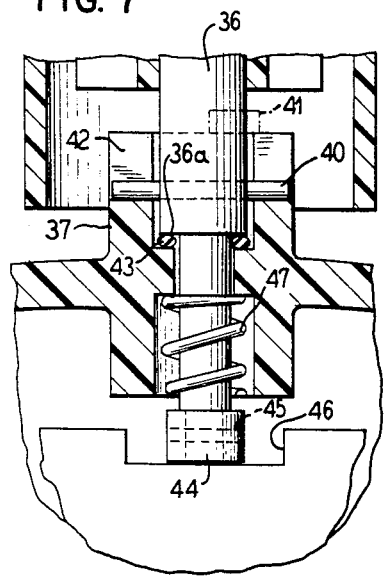
FIG. 7 is a fragmentary view in elevation of the valve stem and latch assembly shown in FIG. 5 with the cover being in the closed position.

A shoulder 36a formed in the valve stem 36 is arranged to engage an O-ring 43 and compress it into sealing relation as illustrated in FIG. 7, to prevent venting of air from the interior of the housing. When the valve stem 36 is in the raised position shown in FIG. 5, however, air can freely pass around the valve stem 36 between the space existing between the periphery of the valve stem 36 and the interior diameter of the boss 37.

Figure 6:
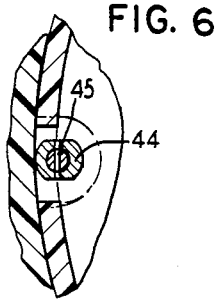
FIG. 6 is a fragmentary cross-sectional view taken substantially along the line VI—VI of FIG. 8.

The valve stem 36 at its lower end has a latch means 44 secured to it by a coupling pin 45. As illustrated in FIG. 6, the latch means 44 has flat opposite sides and is arranged to be received within a groove 46 formed in the upper wall of the housing 32 interior of seal 33. A coiled helical spring 47 urges the latch 44 into the groove 46 thereby compressing the O-ring 43 and terminating communication of air between the interior of the housing and the outside.

Figure 8:
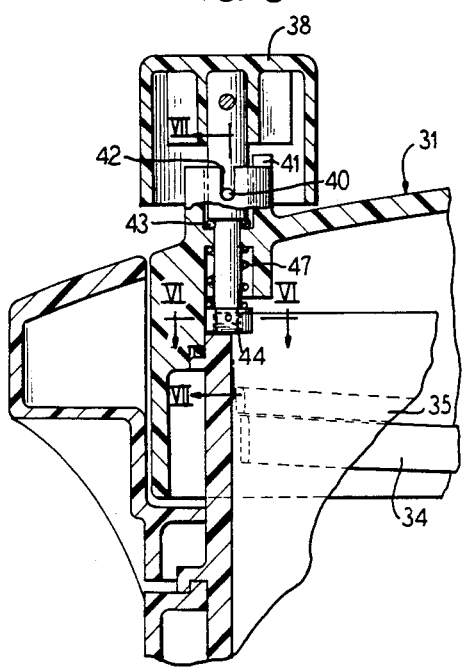
FIG. 8 is a fragmentary view in elevation similar to FIG. 5, but illustrating the cover and housing in the closed or sealed condition.

The knob 38 is rotated approximately 90° so that the pin 40 rides along the top of the boss 37 and ultimately slips into the slot 42 as shown in FIG. 8. The action of the helical spring 47 thereby forces the valve stem 36 down and seats the latch 44 within the groove 46. The cover is then sealed to the housing and superatmospheric pressure can be applied to the contents of the container.

To release the pressure seal, the knob 38 is first raised which lifts the pin 40 out of the groove 42 and permits air to be vented around the valve stem 36 since the O-ring 43 is no longer being compressed. Then rotation of the knob by about 90° causes the pin 40 to ride on the upper surface of the boss 37 until it contacts a stop 41. Then, the cover can be disengaged from the housing by rotating the cover 31 relative to the housing 32 by the appropriate amount until the complementary helical rib segments 34 and 35 move into a relative position where the cover can be bodily removed from the housing. With the structure described, it is impossible to remove the cover until the air pressure has been relieved, thereby preventing accidental spattering of the contents.

It should be appreciated that the valve system disclosed prevents development of superatmospheric pressure in the pressure vessel unless the top is locked against rotation by the extension of the latch 44 into the groove 46 thereby closing the vent path past seal 43 and prevents removal of the top 31 when any excess pressure is present in the vessel. Thus, the valve presents a dual fail safe feature. Further, by proper selection of the spring 47 and dimensioning of the valve body, the valve assembly can act as an overpressure release valve automatically venting excessive pressure.

It will be evident that various modifications can be made to the described embodiments without departing from the scope of the present invention.

I claim as my invention:

1. A pressure vessel for storing and delivering liquid under pressure comprising a housing, a removable cover on said housing, seal means between said housing and said cover providing a liquid-tight and air-tight seal therebetween, locking elements extending between said cover and said housing and providing a bayonet-type lock therebetween, and a manually unlockable excess pressure valve in said cover, said valve comprising a valve housing, vent means formed in said valve housing, a valve stem in said valve housing having a valve seating face arranged to be seated against a valve seat in said cover, spring means urging said valve seating face into seated relation, and means permanently formed on at least one of said valve stem or said cover for locking said valve seating face in unseated relation against the action of said spring means.

2. A pressure vessel according to claim 1 wherein said cover has circumferential grooves therein and said pressure vessel has circumferential projections therein received in said grooves in locking relation.

3. A pressure vessel according to claim 1 which includes an extension on said valve stem below said valve seating face and said housing including recesses formed therein which receive said extension to prevent relative rotation between said cover and said housing.

4. A pressure vessel according to claim 1 wherein said valve housing is integral with said cover.

5. A pressure vessel according to claim 1 which includes handle means on said valve stem for rotating the same, and abutment means for holding said handle means in a raised position in which said valve seat is in its unseated position.

6. A pressure vessel according to claim 1 which includes a collar located centrally of said cover, said collar having a bore extending therethrough, a liquid receptacle positioned within said housing, and a flexible conduit extending into said liquid receptacle and having one end communicating with said bore.

7. A pressure vessel for storing and delivering liquid comprising a housing, a removable cover on said housing, seal means between said housing and said cover providing a liquid-tight and air-tight seal therebetween, segmented locking means extending between said cover and said housing, said locking means in an open relative position permitting said cover to be lifted from said housing and in a closed relative position compressing said seal means and providing said liquid-tight and air-tight seal, a valve stem mounted for vertical sliding movement in said cover, a latch means carried by said valve stem, groove means formed in said housing arranged to receive said latch means when said cover and housing are in said closed position, said valve stem being oriented in said open position to vent air from said housing, and closing off passage of air from said housing in said closed position and means permanently formed on at least one of said cover and said valve stem for locking said valve stem in said open position.

8. A pressure vessel according to claim 7 wherein said valve stem is rotatable into one position in which said latch means is received in said groove and into a second position wherein said latch means is free of said groove.

9. A pressure vessel according to claim 8 which includes spring means urging said valve stem into said one position.

10. A pressure vessel according to claim 9 which includes a pin carried by said valve stem and groove means in said cover, said spring means acting to seat said pin within said groove.

11. A pressure vessel according to claim 10 which includes a seal ring compressible by said valve stem when said pin is seated in said groove to prevent venting air from said housing.

12. A pressure vessel for dispensing fluids from the interior of the vessel under pressure through a conduit to a fluid utilizer by increasing the air pressure interior of the pressure vessel, comprising: a vessel body having an open top, a cover means for closing the vessel body, a quick disconnect part turn threads on said cover and said vessel body for inter-connecting the cover and vessel body, seal means for sealing the cover to the vessel body when the cover means is in at least one thread engaged rotational position with respect to the vessel body, latch means for preventing rotation of the cover with respect to the vessel body, said latch means including a plunger member carried by said cover, a recess in said vessel body adjacent the open end thereto, said plunger member having spring means urging a portion of the plunger member into said recess, the portion when in said recess restricting rotation of the cover means with respect to the vessel body, said recess located adjacent a position of the threads where the cover member is sealing secured to the body, grasping means associated with said plunger member for lifting said plunger member out of said recess, a vent passageway associated with said plunger member effective to communicate the interior of the pressure vessel through the cover the exterior atmosphere, seal means for closing said vent passageway, a seal seat means for loading said seal means against the seal seat when said plunger member is in said recess, said means for loading deactivated upon withdrawal of the plunger member from said recess and means permanently formed on at least one of said plunger member and said cover for locking said plunger member in a withdrawn position relative to said recess whereby withdrawal of the plunger member from the recess automatically vents the interior of the pressure vessel through said vent passage.

13. A device according to claim 12, including means for opening said vent passage in response to excessive pressure in the pressure vessel.

14. The device of claim 13, wherein the means for opening said vent passage in response to excessive pressure comprises a spring bias of a part of the plunger against the seal and pressure exposed surfaces of the plunger opposed to the bias.

15. A pressure vessel according to claim 1 wherein said means for locking said valve seating face in unseated relation comprises said valve stem having a longitudinal axis and being axially movable and rotatable about said axis; a horizontal pin carried by said valve stem and a slot formed on said valve housing into which said pin is received in one rotational orientation of said valve stem, said pin being axially movable with said valve stem to be movable out of said slot and rotated to a position out of alignment with said slot to hold said valve seating face in said unseated relation.

16. A pressure vessel according to claim 15, wherein said valve housing has an axial end into which said slot is formed, said pin engaging said end when out of alignment with said slot.

17. A pressure vessel according to claim 16, wherein said valve housing has a stop formed on said end spaced from said slot, said stop engagable by said pin upon rotation of said valve stem to prevent further rotation of said valve stem.

18. A pressure vessel according to claim 7, wherein said means for locking said valve stem in said open position comprises said valve stem having a longitudinal axis and being axially movable and rotatable about said axis; a horizontal pin carried by said valve stem and a slot formed on said valve housing into which said pin is received in one rotational orientation of said valve stem, said pin being axially movable with said vlave stem to be movable out of said slot and rotated to a position out of alignment with said slot to hold said valve stem in said open position.

19. A pressure vessel according to claim 18, wherein said valve housing has an axial end into which said slot is formed, said pin engaging said end when out of alignment with said slot.

20. A pressure vessel according to claim 12, wherein said means for locking said plunger member in said withdrawn position comprises said plunger member having a longitudinal axis and being axially movable and rotatable about said axis; a horizontal pin carried by said plunger member and a slot formed on said cover into which said pin is received in one rotational orientation of said plunger member, said pin being axially movable with said plunger member to be movable out of said slot and rotated to a position out of alignment with said slot to hold said plunger member in said withdrawn position.

* * * * *